(12) United States Patent
Reichert et al.

(10) Patent No.: US 7,891,692 B2
(45) Date of Patent: Feb. 22, 2011

(54) ALIGNMENT UNIT FOR CAMPERS AND METHOD OF USE

(75) Inventors: Jerry Scott Reichert, Blodgett, OR (US); Philip L. Chavez, Terrebonne, OR (US); Wayne J. Traina, Albany, OR (US)

(73) Assignee: Jerry S. Reichert, Blodgett, OR (US)

( * ) Notice: Subject to any disclaimer, the term of this patent is extended or adjusted under 35 U.S.C. 154(b) by 342 days.

(21) Appl. No.: 12/069,304

(22) Filed: Feb. 7, 2008

(65) Prior Publication Data

US 2009/0200770 A1 Aug. 13, 2009

(51) Int. Cl.
*B60D 1/36* (2006.01)
(52) U.S. Cl. ...................................... 280/477
(58) Field of Classification Search .................. 280/477; 340/431
See application file for complete search history.

(56) References Cited

U.S. PATENT DOCUMENTS

| | | | |
|---|---|---|---|
| 5,285,205 A | 2/1994 | White | |
| 5,967,596 A * | 10/1999 | Knoop | 296/164 |
| 6,176,505 B1 | 1/2001 | Capik et al. | |
| 6,209,902 B1 * | 4/2001 | Potts | 280/477 |
| 6,386,572 B1 | 5/2002 | Cofer | |
| 6,827,363 B1 * | 12/2004 | Amerson | 280/477 |
| 7,354,057 B2 * | 4/2008 | Milner et al. | 280/477 |
| 2004/0252019 A1 * | 12/2004 | Paull | 340/431 |
| 2006/0163359 A1 * | 7/2006 | Danielson | 235/472.01 |
| 2006/0267745 A1 * | 11/2006 | Larson | 340/431 |
| 2007/0137053 A1 * | 6/2007 | Ball | 33/286 |
| 2008/0238638 A1 * | 10/2008 | Phillips | 340/431 |

* cited by examiner

*Primary Examiner*—Tony H. Winner

(57) ABSTRACT

A camper alignment system for use in guiding a pickup under a camper for loading of the camper uses a light source and a target for alignment. The pickup has a pickup cab and a pickup bed having a bed length. The camper has a camper front portion and a camper base. There is a light source capable of emitting a beam of light in the visible light spectrum when in operation. The light source is affixed on the camper front. There is a beam target disposed along the bed length. The beam target is substantially perpendicular with respect to the rear edge of the pickup bed. When the beam of light is substantially parallel to and projecting on the beam target, the pickup can be safely backed up toward the camper front portion and under the camper base for transport of the camper with the pickup.

11 Claims, 5 Drawing Sheets

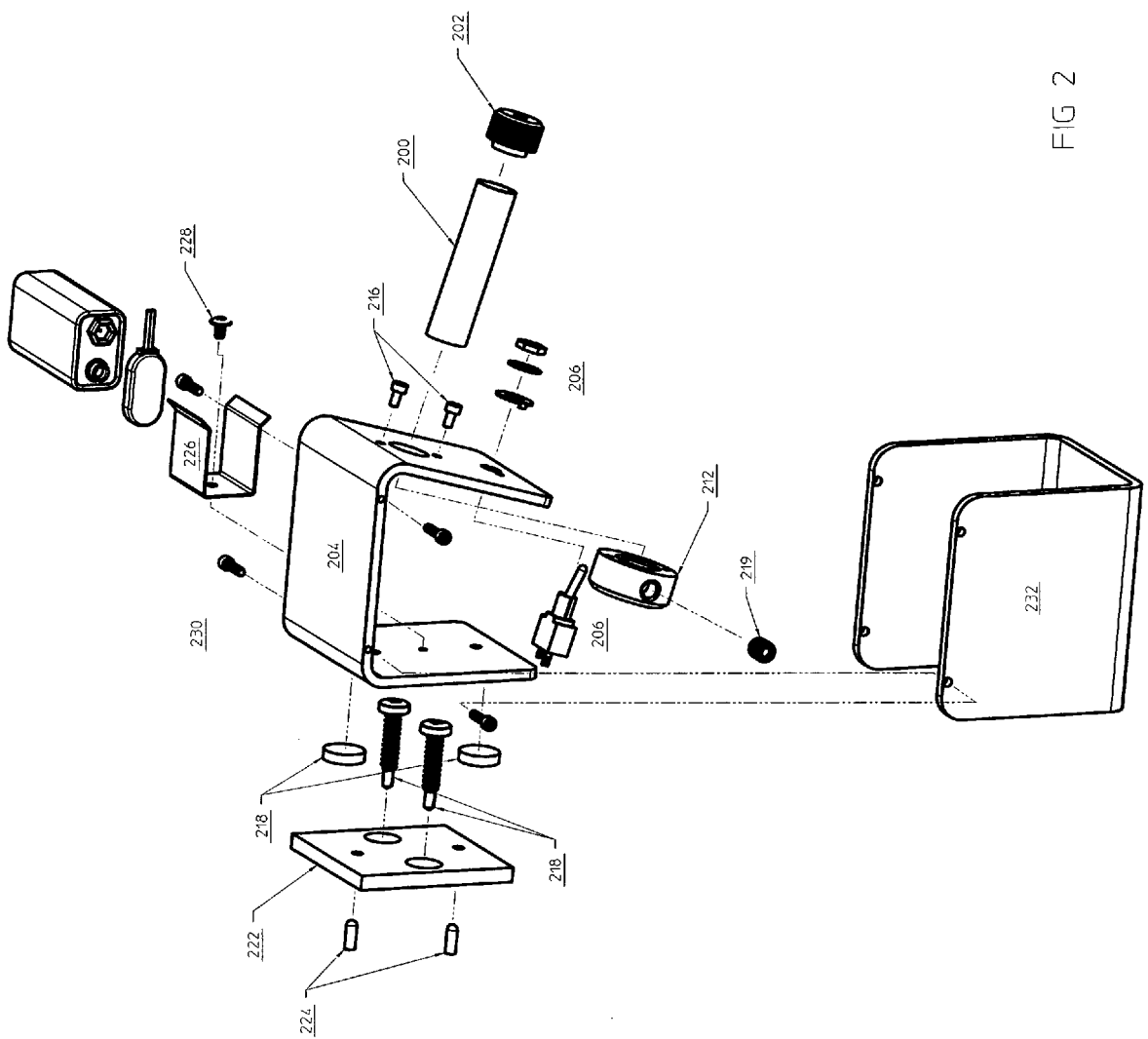

ALIGNMENT UNIT FOR CAMPERS AND METHOD OF USE

FIELD OF THE INVENTION

This invention relates to recreational vehicle alignment and loading systems and more particularly to an alignment and loading unit and method of use for loading a camper onto the bed of a pickup.

BACKGROUND OF THE INVENTION

In the present market there are no simplistic, non-contact devices available to align a camper to the bed of a pick-up in preparation for backing under the camper. Owners of campers are forced to use a trial and error method of alignment of the pickup to the camper when backing under the camper. In the event of misalignment, there can be damage to the pickup bed, the camper, and its jacks. In the worst case, the camper is pushed over. Typically, it takes two people for secure, proper alignment and loading of a camper onto a pickup. With only one person, the driver must get out of the vehicle to check alignment—sometimes multiple times.

There are several factors that make loading a camper a challenge. Varying pickup and camper sizes and architectures make each situation a different type of challenge. For example, some vehicle manufactures have a tapered bed—wider at the cab than at the tailgate. This angle eliminates the usefulness of the beds edge as a guide to align the camper and pickup during loading.

One type of loading system currently available is a mechanical device. A frame is placed in the bed of a pick-up and the camper is loaded by pulling with cables and gears into the frame. The primary difficulty occurring with this system is the alignment to the frame—it is critical that it is perfectly centered prior to the insertion of the camper. If the camper is not aligned properly it will become wedged in the frame causing damage to the frame or to the camper. As campers have become larger and heavier it is more difficult to use this system. A larger camper will require at least two people to operate this system safely. This system is both expensive as well as difficult to set up for proper use.

There is a need for a system for aligning campers to the bed of a pickup that is easy to use, allows for single operator use, minimizes potential contact of the camper with the pickup bed, and simple in construction for cost effective manufacturing.

SUMMARY OF THE INVENTION

The present invention is a camper alignment system for use in guiding a pickup under a camper for loading of the camper onto the pickup. The system has a light source capable of emitting a beam of light in the visible light spectrum when in operation. The light source is affixed on the front of the camper. A beam target is disposed along the length of the bed of the pickup and is substantially perpendicular with respect to the rear edge of the pickup bed. When the beam of light is substantially parallel to and projecting on the beam target, the pickup can be safely backed up toward the camper front and under the base of the camper for loading.

In the preferred embodiment, the light source is temporarily affixed to the front of the camper and is removed prior to backing the pickup complete under the camper and can be easily stowed within the truck or the camper.

It is an object of the present invention to provide an alignment unit for campers that is easily used by a single operator or driver.

It is a further object of the present invention to provide an alignment unit for campers that is simplistic in design for low cost manufacturing.

BRIEF DESCRIPTION OF THE DRAWINGS

The above description and other objects, advantages, and features of the present invention will be more fully understood and appreciated by reference to the specification and accompanying drawings, wherein:

FIG. 2 is an exploded view of the preferred embodiment of the alignment unit of the present invention.

DRAWING REFERENCE NUMBERS

| | |
|---|---|
| 100 | Alignment Unit |
| 200 | Laser |
| 202 | Laser Line Generator |
| 204 | Mounting Bracket |
| 206 | On/Off Switch |
| 208 | On/Off Switch Mounting Nut |
| 210 | On/Off Switch Mounting Washer |
| 212 | Set Collar |
| 214 | Set Collar Set Screw |
| 216 | Set Collar Mounting Screws |
| 218 | Base Plate Disc Magnet |
| 220 | Base Plate Mounting Screws |
| 222 | Base Plate |
| 224 | Base Plate Dowel Pin |
| 225 | Battery |
| 226 | Battery Clip |
| 228 | Battery Clip Mounting Screw |
| 230 | Cover Mounting Screw |
| 232 | Cover |
| 300 | Alignment Tape |
| 302 | Laser Beam |
| 303 | Pickup |
| 304 | Pickup Cab |
| 305 | Camper Front |
| 306 | Camper |
| 308 | Pickup Bed |

DETAILED DISCUSSION OF THE PREFERRED EMBODIMENTS

Referring to the figures, like elements retain their indicators throughout the several views.

Figure 1:
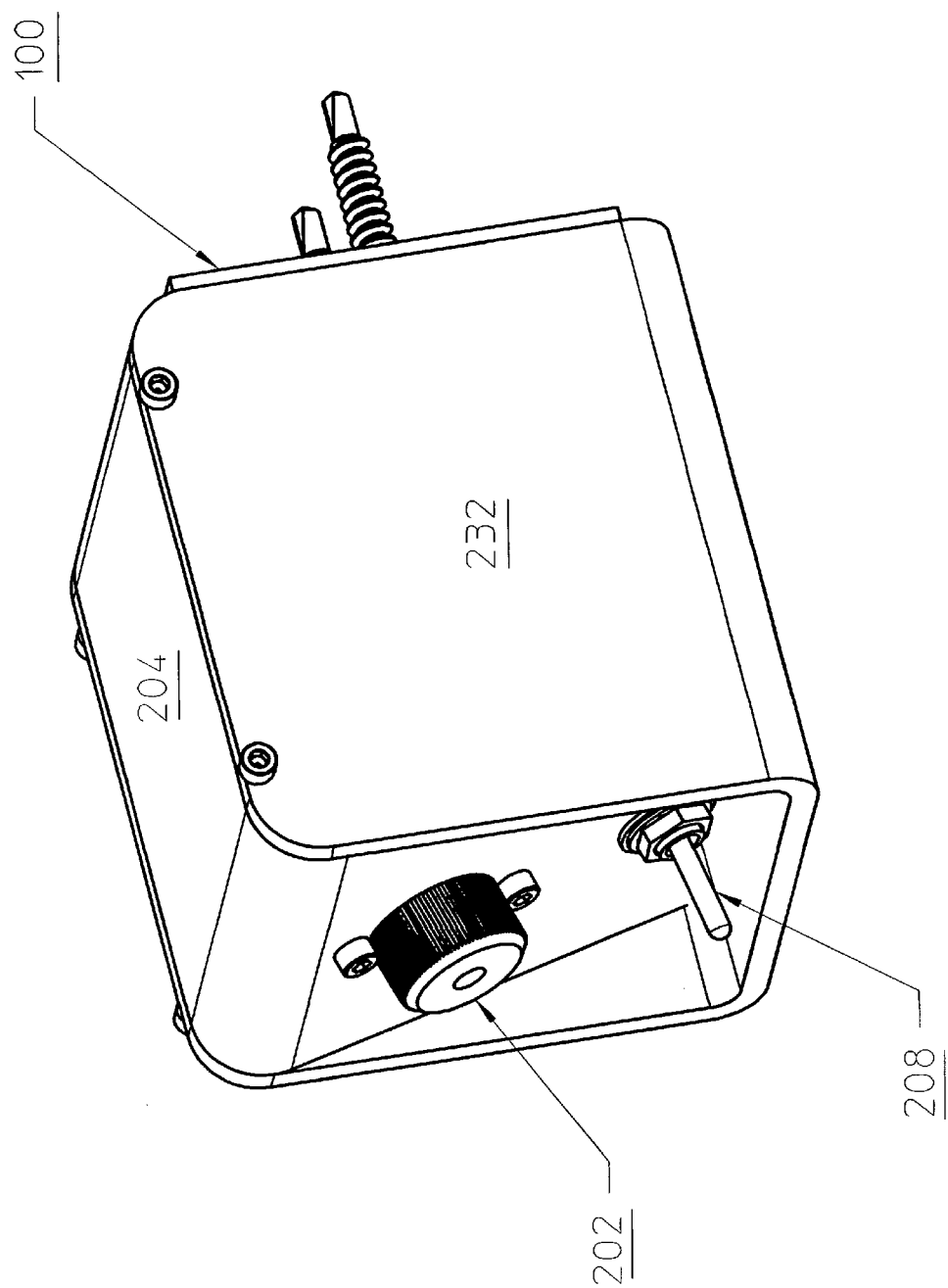
FIG. 1 is an isometric view of the preferred embodiment of the alignment unit of the present invention.

FIG. 1 is an isometric view of the preferred embodiment of Alignment Unit 100 of the present invention. In this preferred embodiment, Cover 232 is a single panel that covers the bottom of Alignment Unit 100 and extends up each opposing side. Similarly, Mounting Bracket 204 is a single panel that covers the top portion of Alignment Unit 100 and extends down both the front and back sides. The simplistic enclosure made with the combination of Cover 232 and Mounting Bracket 204 is intended to decrease manufacturing costs while minimizing assembly components. However, it has been contemplated that the enclosure could also have a separate panel for each of the four sides, the top, and the bottom.

In the preferred embodiment, Cover 232 and Mounting Bracket 204 are constructed from approximately ⅛" thick aluminum that is bent to the required shape. Other acceptable materials are titanium, sheet stainless or mild steel, any type of high density plastic or fiberglass capable of maintaining its shape, or any other material study enough to hold the contents of Alignment Unit 100.

Laser Line Generator 202 and On/Off Switch 206 are mounted to and extend from the front portion of Mounting Bracket 204. Laser Line Generator 202 projects an alignment beam from Laser 200 (not shown). Base Plate Mounting Screws 220 extend through Base Plate 222 to attach Base Plate 222 to the camper (not shown). In the preferred embodiment, Base Plate 222 is made of a ferrous material and is held to Mounting Bracket 204 by Base Plate Disc Magnets 218 (not shown) which are permanently affixed to Mounting Bracket 204.

FIG. 2 is an exploded view of the preferred embodiment of Alignment Unit 100 of the present invention. Laser 200 is preferably a 635 nanometer, 5 milliwatt laser powered by a 9 volt Battery 225. However, any type of light source with or without an aperture that will create a visible line can be used. This includes but is not limited to an LED, a basic incandescent beam, or even some types of florescent light sources.

Laser 200 is held in place Set Collar 212 placed inside of Mounting Bracket 204. Set Collar 212 is attached to Mounting Bracket 204 with Set Collar Mounting Screws 216 that extend through Mounting Bracket 204. Set Collar 212 has Set Screw 214 which extends to Laser 200 holding it firmly in place. Line Generator 202 attaches to Laser 200 and, in the preferred embodiment, creates an approximately ⅛ inch wide by approximately 72 inch long beam at an approximately 15 degree angle downward. As will be discussed in detail later, this beam will project onto the bed of a pickup as it approaches the camper for loading.

Laser 200 is powered by Battery 225. Battery 225 slides into Battery Clip 226 that is mounted inside of Mounting Bracket 204 with Battery Clip Mount Screw 228. On/Off Switch 206 switches the power on and off to Laser 200. On/Off Switch 206 is installed inside Mounting Bracket 204 with the toggle portion of On/Off Switch 206 extending through the front of Mounting Bracket 204. On/Off Washer 210 slides over On/Off Switch 206 from the outside and is held in place with On/Off Mounting Nut 208.

With all of the components installed in Mounting Bracket 204, Cover 232 slides up and around Mounting Bracket 204 and is held in place with a series of Cover Mounting Screws 230.

Base Plate 222 is fixedly attached to the front surface of the camper (not shown) by Base Plate Mounting Screws 220. In the preferred embodiment, Base Plate 222 is essentially centered and toward the lower edge of the front surface of the camper (not shown). It has also been contemplated to mount Base Plate 222 off center on the front edge of the camper. In this alternate embodiment, the receiving target must also be mounted equally off center and essentially parallel to the projected beam.

In the preferred embodiment, Base Plate Dowel Pins 224 extend from Base Plate 222 and are used as alignment pins that extend into corresponding holes (not shown) in the back portion of Mounting Bracket 204.

Base Plate Disc Magnets 218 are attached to the back portion of Mounting Bracket 204 and serve as additional holding means to hold Alignment Unit 100 to the camper. With Base Plate Disc Magnet 218 and Base Plate Dowel Pin 224 as the means of holding Alignment Unit 100 to the camper, the user can easily and quickly properly place and remove Alignment Unit 100. The actual unit alignment in the preferred embodiment is only required during the initial set up and placement as Base Plate 222 is permanently affixed to Camper Front 305.

Figure 3A:
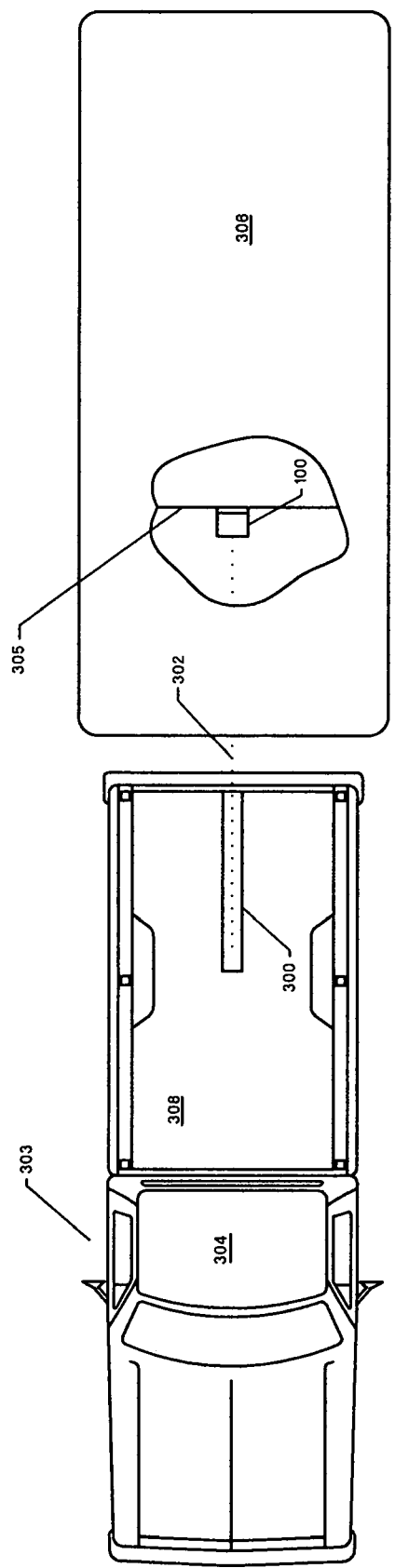
FIG. 3A is a top view of the present invention.

FIG. 3A is a top view of the preferred embodiment of the present invention. In FIG. 3A, Pickup 303 is preparing to drive under and load Camper 306 onto Pickup Bed 308. In a cutaway view, Camper Front 305 is shown with Alignment Unit 100 mounted essentially centered and on a lower edge of Camper Front 305. Similar to prior methods of preparation and placement of a camper for loading, the bottom edge or base of Camper 306 must be level and approximately two to four inches above Pickup Bed 308.

In the preferred embodiment, Alignment Tape 300 is disposed approximately in the center and down the length of Bed 308. Preferably, Alignment Tape 300 is an approximately three-quarter inch wide strip of reflective tape. However, Alignment Tape 300 may be wider or narrower depending on the application and the width of Laser Beam 302. For best results, Alignment Tape 300 should be approximately the width of Laser Beam 302 or slightly wider. In an alternate embodiment, where very tight camper to truck bed tolerances are required, there is an approximate ½" stripe down the center of Alignment Tape 300 that assists in assuring the camper is centered with respect to Pickup Bed 308.

Alternately, Alignment Tape 300 is a painted stripe or any tape that allows Laser Beam 302 or any other light source to be easily seen by the driver. With Alignment Unit 100 switched on, the driver can easily see the placement of Laser Beam 302 with respect to Alignment Tape 300 as Pickup 303 approaches Camper 306. For the optimum alignment, Laser Beam 302 is centered on and parallel to Alignment Tape 300. Laser Beam 302 is preferably an approximately 90 degree, vertical fan of light. However, it has been contemplated to have Laser Beam 302 have a downward angle as small as 15 degrees—depending upon the required accuracy and loading situation.

Figure 3B:
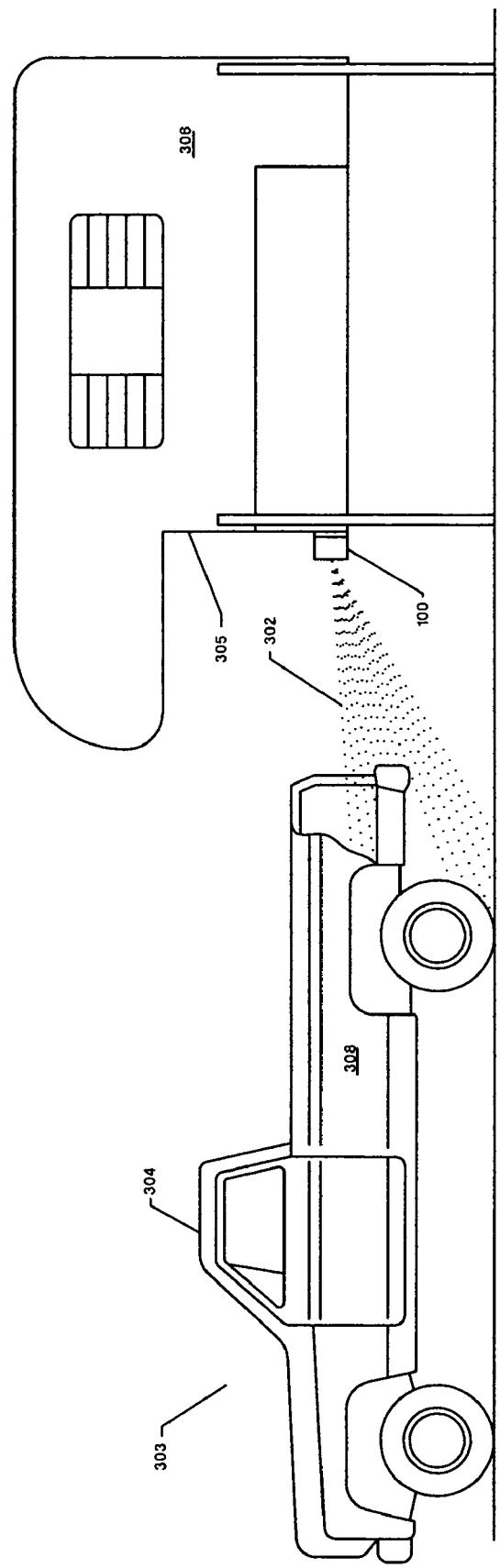
FIG. 3B is a side view of the present invention.

FIG. 3B is a side view of the preferred embodiment of the present invention. Camper 306 is shown in the appropriate position for loading—level, and slightly above the height of Pickup Bed 308. In the preferred embodiment, Alignment Unit 100 is magnetically attached to Base Plate 222 attached to the lower edge of Camper Front 305 and Laser Beam 302 is shown projecting downward onto Pickup Bed 308. As the driver backs Pickup 303 toward Camper 306, Pickup 303 is steered to center Laser Beam 302 along the length of Alignment Tape 300. Once the driver has Laser Beam 302 essentially centered and parallel on Alignment Tape 300, the driver stops, straightens the wheels of Pickup 303 and backs up toward Camper 306. When the driver is confident that alignment is true, Alignment Unit 100 is removed from Camper Front 305 and the driver continues to back Pickup 303 under Camper 306 to complete the loading. In some situations this will be within a foot of Pickup 303. However, some drivers may prefer to have Camper 306 very close to Pickup 303 before removing Alignment Unit 100. The ease of removal of Alignment Unit 100 allows this to be a user preference.

Alignment Unit 100 is easily attached and removed from Camper 306. Accurate alignment of Pickup 303 to Camper 306 is easily done by the driver alone with no need for assistance. In the preferred embodiment, Alignment Unit 100 is extremely light and small enough to fit behind the seat of Pickup 303 or, for larger pickups, in the glove box. Base Plate 222 is so thin and small that it can be permanently left mounted on Camper 306 with little or no adverse aesthetic effects.

Figure 4:
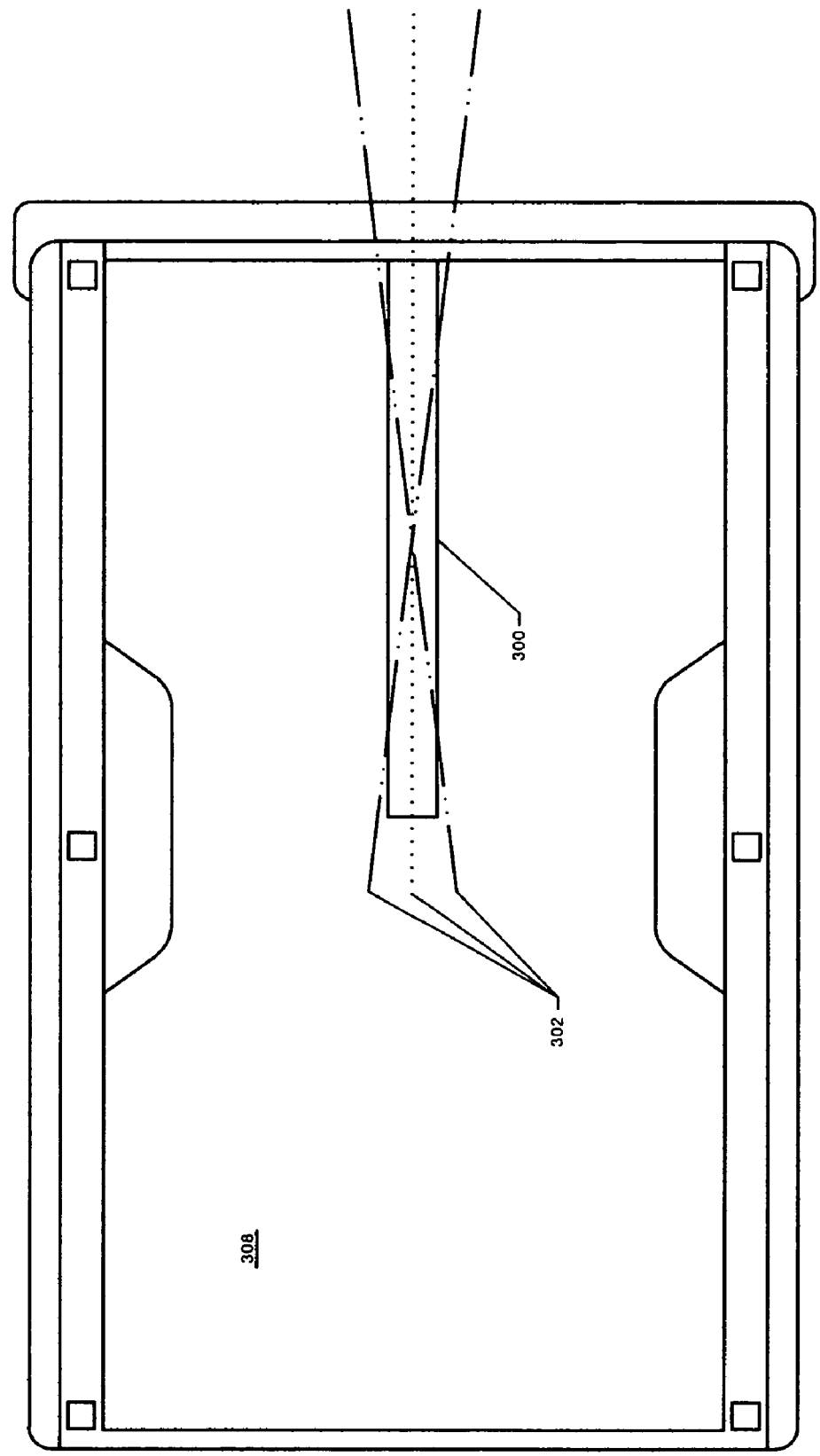
FIG. 4 is a top view of a pickup bed depicting the alignment unit of the present invention projecting a laser beam onto the alignment tape disposed in the pickup bed.

FIG. 4 is a top view of Pickup Bed 308 depicting Alignment Unit 100 of the present invention projecting three different Laser Beam 302 onto Alignment Tape 300 disposed in Pickup Bed 308. The phantom Laser Beam 302 lines are examples of improper alignment. With Camper 306 still sufficiently far enough away from Pickup Bed 308, the driver can easily steer Pickup 303 right or left for proper alignment of Laser Beam 302 with Alignment Tape 300. The solid Laser Beam 302 depicts the proper alignment of Pickup 303 to Camper 306— the driver can safely back under Camper 306 with no fear of error.

Wherein the terms and expressions which have been employed in the foregoing specification are used therein as terms of description and not of limitation, there is no intention, in the use of such terms and expressions, of excluding equivalents of the features shown and described or portions thereof, it being recognized that the scope of the invention is defined and limited only by the claims which follow.

We claim:

1. A truck camper alignment system for use in guiding a pickup under a truck camper for loading of the truck camper, the pickup having a pickup cab and a pickup bed having a bed length and a bed rear edge, the truck camper having a truck camper front portion and a truck camper base, comprising:
    a light source capable of emitting a beam of light in the visible light spectrum in the form of a laser line at least 8 feet long, when in operation, said light source affixed on the truck camper front portion; and
    a beam target disposed along the bed length, said beam target is substantially perpendicular with respect to the bed rear edge;
    wherein, when said laser line beam of light is substantially parallel to and projecting on said laser line beam target, the pickup can be safely backed up toward the truck camper front portion and under the truck camper base for loading and carrying of the truck camper.

2. The truck camper alignment system of claim 1, wherein the light source is a laser with a line generator producing a line at least 8 feet long.

3. The truck camper alignment system of claim 1, wherein said laser line light source is essentially centered on the truck camper front portion projecting a laser line toward the front of the pickup bed.

4. The truck camper alignment system of claim 1, further comprising a mounting base fixedly attached and essentially centered on the truck camper front portion, wherein said light source could be permanently or temporarily attached to said mounting base during truck camper alignment and removed if temporary mounted until needed for subsequent truck camper alignment and loading.

5. The truck camper alignment system of claim 4, further comprising said mounting base could be substantially off center with the laser target mounted in the pickup bed equally off centered mounted tin the pickup bed.

6. The truck camper alignment system of claim 1, wherein said light source is powered with a battery attached proximate said light source.

7. The truck camper alignment system of claim 1, wherein said light source is powered from a power source within the truck camper.

8. A method for aligning a truck camper to a pickup for loading using a system recited in claim 1, comprising the steps of:
    raising the truck camper to a level wherein the truck camper base is higher than the pickup bed;
    activating said line generating laser light source;
    backing the pickup proximate the truck camper front portion wherein said line generating laser beam of light projects proximate said beam target;
    aligning the pickup bed until said line generating laser light beam
    is substantially centered on and substantially parallel to said beam target; and
    backing the pickup toward and under the truck camper base until the truck camper front is sufficiently close to the pickup cab for carrying and safe transport.

9. The method for aligning a truck camper to a pickup for loading using a system recited in claim 1, further comprising the steps of:
    attaching the light source to the truck camper front portion, if mounting is temporary, prior to activating said light source; and
    removing the light source, if mounting is temporary, prior to completion of backing the pickup under the truck camper base.

10. The truck camper alignment system of claim 1, wherein a width of said beam target is approximately one inch wide strip of reflective tape or said width could be varied to cause wider or narrower tolerance during loading.

11. The truck camper alignment system of claim 1, wherein a width of said beam target is approximately one inch wide painted stripe or said width could be varied to cause wider or narrower tolerance during loading.

* * * * *